Patented May 5, 1936

2,039,366

UNITED STATES PATENT OFFICE 2,039,366

COATING COMPOSITION

Charles A. Thomas, Dayton, Ohio, assignor to Dayton Synthetic Chemicals, Inc., Dayton, Ohio, a corporation of Ohio No Drawing. Application November 24, 1934, Serial No. 754,615. In Canada September 11, 1931

10 Claims. (Cl. 134—26)

This invention relates to the manufacture of a composition suitable for use as a protective coating and the like derived from certain synthetic hydrocarbon polymer resins of a petroleum origin combined with oils of the glyceride specie such as linseed oil, tung oil, castor oil and the like. The present application is a division in part of my copending applications Serial Numbers 528,706 now Patent No. 1,982,707 and 482,157, now Patent No. 1,947,626.

In the practicing of this invention unsaturated hydrocarbons, such as olefines and diolefines including cyclic olefines and cyclic diolefines, are reacted together or with a substituted benzene, such as toluene, in the presence of a suitable catalyst, such as anhydrous aluminum chloride, to produce by polymerization and/or condensation a resinous reaction product adapted to commercial uses.

Reference is herein made to the copending application of Charles A. Thomas, Serial No. 461,807, filed June 17, 1930, which discloses and claims a method of producing a resin by reacting an open chain olefine and an open chain diolefine; also to the copending application of Charles A. Thomas, Serial No. 482,157, filed September 15, 1930, now Patent 1,947,626, which discloses and claims the reaction product of a substituted benzene and an open chain diolefine; and the copending application of Charles A. Thomas, Serial No. 518,132, filed February 25, 1931, which discloses and claims the reaction product of an open chain olefine and an open chain diolefine with a substituted benzene.

In carrying out this invention various diolefines, or cyclic olefines and diolefines may be reacted together or with various open chain diolefines, and/or with various substituted benzenes. For example very satisfactory results have been secured by reacting a cyclic olefine, such as cyclohexene, with a mixture of a cyclic diolefine such as cyclohexadiene, and a substituted benzene, such as toluene; or by reacting a cyclic olefine, such as cyclohexene, with a mixture of an open chain diolefine, such as isoprene, and a substituted benzene, such as toluene. A cyclic diolefine, such as cyclohexadiene, has also been reacted with a mixture of an open chain olefine, such as pentene-2, and a substituted benzene, such as toluene or the xylenes and their homologues. Other cyclic olefines and diolefines may be used in these reactions to produce resins, such as methyl cyclohexene, cyclopentene, cyclopentadiene and their homologues. Other substituted benzenes may also be used in these reactions, for example, ortho, meta or para xylene or a commercial mixture of xylenes, mesitylene and amyl benzene. Cyclic diolefines may also be reacted with open chain olefines, such as the amylenes, symmetrical and unsymmetrical methyl ethyl ethylene, and normal propyl ethylene or pentene-2, to produce resins in this manner. Cyclic olefines may also be reacted in this manner with open chain diolefines, such as hexadiene, isoprene, and butadiene, which are representative members of this group. A cyclic olefine may also be reacted with a cyclic diolefine in this manner to produce a resin. A cyclic diolefine alone, or a mixture of two or more cyclic diolefines, also can be used to produce resins in the manner described. Other unsaturated hydrocarbons or substituted benzenes belonging to the above mentioned classes may be used in a similar manner.

Mixtures of pure unsaturated hydrocarbons containing these constituents as specified above, or indeterminate mixtures such as fractions of cracked distillate containing such compounds, can be reacted to produce a resin in accordance with this invention. For example, the following combinations of unsaturated hydrocarbons containing a cyclic olefine or cyclic diolefine have been reacted to produce resins according to this invention:

1. A cyclic olefine with an open chain diolefine.
2. A cyclic olefine with a cyclic diolefine.
3. A cyclic diolefine with an open chain olefine.
4. A cyclic diolefine with an open chain olefine and a substituted benzene.
5. A cyclic olefine with an open chain diolefine and a substituted benzene.
6. A cyclic olefine with a cyclic diolefine and a substituted benzene.
7. A cyclic diolefine with a substituted benzene.
8. A cyclic diolefine alone, or a mixture of two or more cyclic diolefines.
9. A diolefine with a substituted benzene.

As an example of the carrying of this invention into effect the following procedure is described using one part by volume of cyclohexene and one part by volume of isoprene with approximately 3.5 parts by volume of toluene. A mixture of these hydrocarbons in the proportions specified is placed within a suitable container or polymerizing vessel, and an activating compound such as powdered anhydrous aluminum chloride is added while the mixture in the vessel is being agitated. The aluminum chloride is preferably pulverized to give better contact and to increase the rate of and ease of solution. The activating compound is added in small quantities at a time while the contents of the polymerizing vessel are being agitated. It is found that the activity of the catalyst is directly proportional to the amount which goes into solution in the reaction mixture. It is therefore desirable that the solution should be as complete and as rapid as possible. For this reason rapid agitation during the addition of the catalyst and during the polymerization reaction is desirable. When 25 gallons of a mixture of active ingredients are to be treated within the polymerizing vessel, aluminum chloride may be added in quantities of approximately 6 to 8 ounces at a time. With the addition of the first batch of aluminum chloride there is a rather active chemical reaction with a resultant rise in temperature. Where an atmospheric polymerizing vessel is used it is desirable that the temperature of the reaction be controlled so that it is not permitted to rise much above 40° C. Otherwise the polymerizing vessel should be kept under pressure to prevent undue volatilization and loss of resin. Polymerization at higher temperatures, such as above 65° C., requires a special pressure vessel. Very satisfactory results are secured when the temperature is controlled between 25° C. and 35° C., this being readily accomplished by introducing the aluminum chloride in small amounts with proper agitation to prevent local overheating and by cooling the reaction mass by a suitable cooling jacket. This polymerizing reaction is preferably carried out in the absence of water. Water present during the reaction hydrolyzes the catalyst to form an acid which in turn affects reaction, resulting in a darker and quite different resin product.

Additional batches of aluminum chloride are added from time to time as may be done without unduly increasing the temperature of the reaction mass, and this is repeated with continuous agitation until no further temperature rise results. The amount of aluminum chloride used is also controlled in accordance with the materials being treated as this materially affects the yield and character of the resin. As the amount of catalyst used is increased, the yield of resin is found to increase, while the resin tends to be harder, lighter in color and lower in iodine number. The quantity of catalyst needed for producing the particular grade or quality of resin desired can be readily determined by tests for the particular ingredients being treated. Thus, when treating the above mixture in 25 gallon batches, satisfactory results are secured by the addition of about 10 pounds of catalyst, this being equivalent to approximately 5.0 grams of catalyst for 100 cc. of active ingredients.

In addition to aluminum chloride, other metallic halide compounds such as chlorides of iron, zinc, antimony, indium, titanium, tin, and boron may be used. The reaction may proceed as much as 12 hours, but it is found desirable not to leave the catalyst in contact with the materials for a period of time much in excess of this, as the resin may be darkened. It appears that the yields of resin do not continue to increase in a straight line function with the amount of catalyst added. At a certain point the yield as well as the iodine number appears to become constant. It is also found that the density of the polymerized product at this point becomes constant, and that the addition of more catalyst does not increase the specific gravity of the polymerized mass. It may be that the reason the action does not proceed beyond such a point, is that at that point the mixture is saturated with catalysts. If this is true, since the yield and iodine value appear to be proportional to the amount of catalyst in solution, and since no more solution can be effected at the given temperature the reaction stops at this point. When desired, however, the reaction may be stopped at an intermediate point, after the addition of the requisite amount of catalyst.

The resulting reaction product is a viscous mass, dark in color. This viscous material is then neutralized to terminate or kill the polymerizing reaction. Various water soluble alkalies may be used for this neutralizing, but preferably ammonia is employed as the excess of this material can be removed by distillation and has no injurious effects on the resulting resin. The neutralizing treatment is preferably carried out in the presence of an organic hydroxy compound, which is effective to supply hydroxyl radicals for the decomposition and precipitation of the aluminum chloride or other activating agent present. An alcohol, such as ethyl alcohol, functions very satisfactorily for this purpose. Other organic hydroxy liquids which are miscible with water, such as methyl alcohol, acetone, etc., may be used for this purpose. Thus a mixture of about 40% by volume of ammonium hydroxide containing 28% $NH_3$ by weight and 60% by volume of 95% ethyl alcohol gives good results. With the quantity specified above, 25 gallons of unsaturated hydrocarbons, slightly more than three gallons of this mixture is used, the amount theoretically required being approximately 3.2 gallons of the above mixture. The mass is agitated constantly during the neutralization and a flocculent precipitate of the activating agent is produced which is readily removed by filtration—for example, where aluminum chloride is used a precipitate of aluminum hydroxide is formed. The neutralization is accompanied by a color change, the reacting mass changing from a black or dark red to a yellowish red as the neutralization is completed. The neutralizing reaction is completed in about a half hour.

After the neutralizing reaction is completed the contents of the neutralizing vessel are preferably heated by means of a suitable temperature controlling jacket to a temperature of about 60° C.- 80° C., or until the distillate comes over clear. That is, the distillation is continued until no more water comes over. For the amounts specified, this operation is continued 1 to 2 hours. During this heating substantially all the excess ammonia and alcohol is liberated and is allowed to pass off to a suitable condenser for the recovery. In this process it is found desirable that substantially all of the water, ethyl alcohol and $NH_3$ be removed to prevent precipitation of the resin and consequent clogging of the filter. If the resin is to be used in a varnish it is exceedingly important that all of the water, alcohol and ammonia are removed by heating, because if a small amount of ammonium chloride formed in the neutralization is held in solution in the resin hydrocarbon mix by the presence of water and alcohol, then when the resin is hardened such ammonium chloride will be occluded in the hard gum. When such gum is used with drying oils such as linseed oil, China wood oil, etc., it reacts with the oils to darken them and also makes the varnish less durable.

When the neutralization is carried out in the presence of water as described above, the subsequent distillation is more difficult and water may be occluded in the resin resulting in an opaque product. Where a clear resin is essential, or for more convenient plant operation, it may be desirable to carry out the neutralizing operation in the absence of water. In such case an anhydrous ethyl alcohol, or other organic hydroxy liquid of the character specified, saturated with dry $NH_3$ gas can be used for the neutralization with very satisfactory results. When no aqueous solutions have been used, the above distillation can be carried out in less time than specified above.

When reacting unsaturated cyclic or open chain hydrocarbons in this manner, it is found that two products are formed, one being an amorphous resin compound readily soluble in benzol, and another being a gelatinous compound insoluble in such solvents. This insoluble compound is carried down in the precipitate. In order to insure complete solution of the resinous product and to facilitate the filtering operation, an organic solvent which is immiscible with water, for instance a hydrocarbon solvent such as benzol, or other organic solvents such as carbon tetrachloride, ethylene dichloride, etc., is added to the neutralized mass after free water and ammonia have been distilled off. In the distillation process approximately one-half of the original reaction mixture used is usually distilled off. The amount of solvent added is then approximately equal to the volume distilled off; that is, for the quantities specified about 12 gallons of benzol are added to the neutralized and distilled mass with very satisfactory results.

The neutralized mass mixed with benzol is then passed through a suitable filter, such as a conventional filter press, where the undissolved materials including the precipitated activating agent are removed from the liquid. The filtered sludge removed in the filter press is preferably treated to recover aluminum oxide ($Al_2O_3$) and ammonium chloride ($NH_4Cl$) as by-products. In place of the filter press a suitable type of centrifuge may be used if desired.

The clear filtrate containing the resin in solution is allowed to pass into a distillation vessel provided with a suitable heating jacket for the introduction of a heating medium such as steam or oil. The material within the distillation vessel is now heated as by means of a jacket to distill off the more volatile constituents, including benzol, which may pass off to a suitable condenser so as to be recovered for repeated use in the process. Distillation is continued until the thermometer in the distillation line rises to approximately 100° C., at which time substantially all of the benzol will have been driven off of the resulting resin which is left in the distillation vessel as a semifluid or pasty mass, termed herein a "soft resin."

This soft resin also contains varying proportions of higher oils, primarily unsaturated hydrocarbon oils of rather high molecular weight, which are not removed by distillation at temperatures not exceeding 100° C.

If desired, the concentration of the resin may be controlled so as to leave a calculated amount of solvent in the resin so that it is maintained in solution form. This solution may then be withdrawn to a convenient place of storage. The resin in solution form in benzol, or other solvent such as solvent naphtha, may be used directly in the paint and varnish industries, or for other suitable uses without concentration to dryness.

If a solid or hard resin is desired, the distillation is continued as described above until substantially all of the readily volatile solvents and higher oils have been driven off. At the same time the temperature of the mass may be raised by means of the heating jacket to a controlled higher temperature.

Where a gas such as air is passed through the resinous mass kept well agitated, the heating jacket may be raised to a higher temperature of the order of 180° C. with resultant rapid increase in the drying and hardening of the resin without injury to the resin. This may be readily accomplished by supplying oil heated to a temperature of about 180° C. to the external jacket. This treatment drives off the remaining solvent and higher oils present in the resin which tend to make it soft.

By avoiding the use of wet steam or substantial quantities of water throughout the drying process, the occlusion of water in the resin is avoided and a clear product obtained. But steam distillation may be advantageously used if occluded water makes no difference in the product, that is, when a clear resin is not desired. When the resin is steam distilled, the iodine value of the resin appears to be somewhat lowered. Means may be used to free this occluded water from the hardened resin, by reheating and melting the resin.

When the desired process has been carried to the desired degree, the resin is removed from the distilling and drying vessel and placed in suitable collecting troughs or shallow pans where it is allowed to cool and harden.

The resin so prepared in accordance with this invention has a brilliant amber yellow color, and is very clear and hard, having an iodine number of about 87.0, a yield of approximately 22.0 grams per 100 cc. of mixture of cyclohexene, isoprene and toluene being obtained. Resins of higher iodine number are frequently obtained.

In preparing resins in accordance with this invention the proportions of the reacting materials may be varied widely; for example, resins are obtained in appreciable quantities from the use of almost all proportions of these reacting materials. As set forth above, characteristics of the resins, including color, iodine and acid numbers, vary somewhat with the variations in starting materials used, relative proportions of such starting materials, amount of catalyst, and other factors. The resin produced in accordance with this invention is soluble in petroleum hydrocarbon solvents and is suitable for making coating materials, molding compounds and for other commercial uses. Other specific embodiments of my invention and other resins falling within the scope of the present invention are disclosed in my aforementioned application Serial Number 482,157, filed September 15, 1930.

It has been found that certain resins produced in this manner have the unusual and valuable property of reacting or combining with a drying oil, such as linseed oil, China wood oil, etc.; or with a non-drying oil, such as castor oil; or with a mixture of a drying oil and castor oil; and this reaction product makes a superior coating material. That is, a chemical reaction appears to take place when these resins are heated to a high temperature of the order of 260° C. with a mixture of a drying oil and castor oil, and a definite resinous reaction product is formed which has characteristic and valuable properties differing from the properties of the original resins.

For example, when a mixture of China wood oil and castor oil is heated with these resins produced in the manner described, and samples taken when the reaction mixture has been heated to about 180° C., a "pill" or cooled drop on a metal plate, is not transparent. However, if heating is continued until the mixture reaches a temperature of the order of 260° C., considerable foaming takes place. A sample taken at this point produces a tough clear pill quite different from that formed when the sample is taken as described above, after heating to a lower temperature, such as 180° C.

Such reaction product of the described resins with castor oil and a drying oil, when used in coating materials, gives a film which is more elastic, more durable, more adhesive, and more impervious to water than films produced by the use of drying oils with other resins not having the property of combining with a drying oil and castor oil. A non-drying oil, such as castor oil, does not enter into combination with other generally used synthetic resins; and a satisfactory coating material is not formed by use of such other synthetic resins with castor oil in conjunction with usual drying oils.

Reference is herein made to the copending application of Charles A. Thomas and Carroll A. Hochwalt, Serial No. 470,535, filed July 24, 1930, which discloses and claims the reaction product of an unsaturated hydrocarbon resin with a drying oil, or with a mixture of a drying oil and a non-drying oil such as castor oil; also to the copending application of Charles A. Thomas, Serial No. 494,692, filed November 10, 1930, which discloses and claims the reaction product of a synthetic resin formed from unsaturated hydrocarbons with a non-drying oil unmixed with a drying oil.

Generally, but not invariably, resins produced in the manner described from a hydrocarbon mixture including a cyclic diolefine and a cyclic or open chain olefine with a substituted benzene, or a cyclic olefine and an open chain diolefine with a substituted benzene, or a cyclic or open chain diolefine with a substituted benzene, have been found to possess this valuable characteristic of reacting with drying oils, or with mixtures of a drying oil and a non-drying oil, such as castor oil.

As further examples of the carrying out of this invention, the following chart shows the results of the reaction of various combinations of these starting materials as specified above.

| | |
|---|---|
| Material and fraction | Cyclohexene ———————— 50 cc. <br> Isoprene ———————————— 50 cc. <br> Heptane ———————————— 150 cc. |
| Catalyst g/100 cc | 3.5. |
| Yield of resins g/100 cc. of active material taken | 30.9. |
| Remarks | Extremely hard, glassy, high melting point, no tackiness even when softened. Brownish amber color. |
| Material and fraction | 1-methylcyclohexene ———— 50 cc. <br> Isoprene ———————————— 50 cc. <br> Heptane ———————————— 150 cc. |
| Catalyst g/100 cc | 3.5. |
| Yield of resins g/100 cc. of active material taken | 31.5. |
| Remarks | Dark red soft resin, flows in cold. |
| Material and fraction | Methylcyclohexene ———— 27 cc. <br> Isoprene ———————————— 26 cc. |
| Catalyst g/100 cc | 9.1. |
| Yield of resins g/100 cc. of active material taken | 48.2. |
| Iodine no | 144.0. <br> 147.0. |
| Remarks | Soft resin—dark brown color. |
| Material and fraction | Isoprene ———————————— 91 cc. <br> Cyclohexene ———————— 91 cc. |
| Catalyst g/100 cc | 5.5. |
| Yield of resins g/100 cc. of active material taken | 47.1 mix. |
| Iodine no | 132.0. <br> 130.0. |
| Remarks | Very hard, clear, brittle, pale amber color with brownish tinge. |
| Material and fraction | Cyclohexene ———————— 40 cc. <br> Isoprene ———————————— 40 cc. <br> Xylene ———————————— 150 cc. |
| Catalyst g/100 cc | 4.4. |
| Yield of resins g/100 cc. of active material taken | 17.2 mix. <br> 49.4 cyclohexene and isoprene. |
| Iodine no | 70.8. <br> 71.3. |
| Remarks | Hard, clear, brittle, dark brown amber. |
| Material and fraction | Cyclohexene ———————— 40 cc. <br> Isoprene ———————————— 40 cc. <br> Toluene ———————————— 150 cc. |
| Catalyst g/100 cc | 4.4. |
| Yield of resins g/100 cc. of active material taken | 22.2 mix. <br> 61.0 cyclohexene and isoprene. |
| Iodine no | 87.7. |
| Remarks | Hard, clear, brittle, very slightly tacky, brilliant amber yellow. |
| Material and fraction | Cyclohexadiene ———————— 35 cc. |
| Catalyst g/100 cc | 2.0. |
| Yield of resins g/100 cc. of active material taken | 37.0. |
| Iodine no | 130.3. <br> 131.3. |
| Remarks | Very hard, clear, brittle, pale amber yellow. |
| Material and fraction | Cyclohexadiene ———————— 23 cc. <br> Cyclohexene ———————— 25 cc. |
| Catalyst g/100 cc | 2.0. |
| Yield of resins g/100 cc. of active material taken | 19.8 mix. <br> 41.3 hexadiene. |
| Iodine no | 115.9. <br> 114.6. |
| Remarks | Very hard, clear, brittle, pale amber yellow. |
| Material and fraction | Cyclohexadiene ———————— 23 cc. <br> Pentene-2 ———————————— 26 cc. |
| Catalyst g/100 cc | 2.0. |
| Yield of resins g/100 cc. of active material taken | 15.1 mix. <br> 32.2 hexadiene. |
| Iodine no | 147.8. <br> 148.2. |
| Remarks | Very hard, clear, brittle, pale amber yellow. |
| Material and fraction | Cyclohexadiene ———————— 23 cc. <br> Toluene ———————————— 27 cc. |
| Catalyst g/100 cc | 2.0. |
| Yield of resins g/100 cc. of active material taken | 18.4 mix. <br> 40.0 hexadiene. |
| Iodine no | 111.3. <br> 110.6. |
| Remarks | Very hard, clear, brittle, pale amber yellow. |

(The abbreviation "g" in the above table stands for grams.)

While the forms of invention herein described constitute preferred embodiments thereof, it is to be understood that the invention is not limited to such precise forms, and that changes may be made therein without departing from the scope of the invention which is defined in the appended claims.

What is claimed is:

1. A coating composition comprising a petroleum hydrocarbon solvent having dissolved therein the resinous reaction product of a drying oil and castor oil with a resin derived from a mixture of hydrocarbons comprising primarily a cyclic olefine, a diolefine and an alkyl benzene.

2. A coating composition comprising a petroleum hydrocarbon solvent having dissolved therein the resinous reaction product of a drying oil and castor oil with a resin derived from a mixture of hydrocarbons containing as essential ingredients a cyclic diolefine and an alkyl benzene.

3. A coating composition comprising a petroleum hydrocarbon solvent having dissolved therein the resinous reaction product of a drying oil and castor oil with a hydrocarbon resin produced by reacting together a mixture of hydrocarbons containing as the essential ingredients an unsaturated cyclic hydrocarbon and another unsaturated hydrocarbon of varying degree of unsaturation and a substituted benzene hydrocarbon.

4. The method in the preparation of a synthetic resinous reaction product having film forming properties and being soluble in a petroleum hydrocarbon solvent, which comprises reacting a mixture of hydrocarbons containing as the essential ingredients a cyclic diolefine and a substituted benzene hydrocarbon in the presence of a metallic halide catalyst, neutralizing the reaction product, with precipitation of the catalyst, separating the solution containing the dissolved resinous reaction product from the precipitated catalyst, separating the resinous reaction product from the solution, and reacting the separated resinous reaction product with a drying oil by heating to a temperature in excess of 250° C.

5. The method in the preparation of a synthetic resinous reaction product, having film forming properties and being soluble in a petroleum hydrocarbon solvent, which comprises reacting together a cyclic hydrocarbon having at least one conjugated double bond with an unsaturated hydrocarbon of a different degree of unsaturation and a substituted benzene hydrocarbon in the presence of a metallic halide catalyst, neutralizing the reaction product with precipitation of the catalyst, separating the solution containing the dissolved resinous reaction product from the precipitated catalyst, separating the resinous reaction product from the solution, and reacting the separated resinous reaction product with a mixture of a drying oil and castor oil by heating the mixture to a temperature in excess of 250° C.

6. A coating composition comprising a petroleum hydrocarbon solvent having dissolved therein the resinous reaction product of a drying oil and castor oil with a resin obtained by the polymerization of a mixture of an alkyl benzene and a diolefine.

7. A coating composition comprising a petroleum hydrocarbon solvent having dissolved therein the resinous reaction product of a drying oil with a polymerized hydrocarbon derived from a mixture of a diolefine and an alkyl benzene.

8. A coating composition comprising a petroleum hydrocarbon solvent having dissolved therein the resinous reaction product of a drying oil with a polymerized hydrocarbon derived from a mixture of a diolefine, an olefine and an alkyl benzene.

9. The method in the preparation of a synthetic resinous reaction product, having film forming properties and being soluble in a petroleum hydrocarbon solvent, which comprises reacting a mixture of hydrocarbons containing as the essential ingredients a diolefine and a substituted benzene hydrocarbon in the presence of a metallic halide catalyst, neutralizing the reaction product, with precipitation of the catalyst, separating the solution containing the dissolved resinous reaction product from the precipitated catalyst, separating the resinous reaction product from the solution, and reacting the separated resinous reaction product with a drying oil by heating to a temperature in excess of 250° C.

10. The method in the preparation of a synthetic resinous reaction product, having film forming properties and being soluble in a petroleum hydrocarbon solvent, which comprises reacting together a hydrocarbon having at least one conjugated double bond with an unsaturated hydrocarbon of a different degree of unsaturation and a substituted benzene hydrocarbon in the presence of a metallic halide catalyst, neutralizing the reaction product with precipitation of the catalyst, separating the solution containing the dissolved resinous reaction product from the precipitated catalyst, separating the resinous reaction product from the solution, and reacting the separated resinous reaction product with a mixture of a drying oil and castor oil by heating the mixture to a temperature in excess of 250° C.

CHARLES A. THOMAS.